(12) United States Patent
Wolin

(10) Patent No.: US 6,751,600 B1
(45) Date of Patent: Jun. 15, 2004

(54) METHOD FOR AUTOMATIC CATEGORIZATION OF ITEMS

(75) Inventor: Ben Wolin, San Francisco, CA (US)

(73) Assignee: Commerce One Operations, Inc., Pleasanton, CA (US)

( * ) Notice: Subject to any disclaimer, the term of this patent is extended or adjusted under 35 U.S.C. 154(b) by 426 days.

(21) Appl. No.: 09/583,650

(22) Filed: May 30, 2000

(51) Int. Cl.[7] .............................. G06F 15/18; G06E 7/00
(52) U.S. Cl. ........................... 706/12; 706/706; 706/59; 706/902
(58) Field of Search ............................. 706/12, 59, 902; 707/100

(56) References Cited

U.S. PATENT DOCUMENTS

| | | | |
|---|---|---|---|
| 5,790,677 A | | 8/1998 | Fox et al. |
| 5,867,799 A | * | 2/1999 | Lang et al. ..................... 707/1 |
| 5,974,412 A | | 10/1999 | Hazlehurst et al. ............. 707/3 |
| 6,049,785 A | | 4/2000 | Gifford |
| 6,212,532 B1 | * | 4/2001 | Johnson et al. ............. 715/500 |
| 6,266,649 B1 | * | 7/2001 | Linden et al. ................ 705/26 |
| 6,366,907 B1 | * | 4/2002 | Fanning et al. ................ 707/3 |
| 6,604,107 B1 | * | 8/2003 | Wang ......................... 707/101 |

OTHER PUBLICATIONS

F. Bergeron and L. Raymond, "Managing EDI for corporate advantage: A longitudinal study," Information & Management, 31, 1997, pp. 319–333, Elsevier.

Robert J. Bonometti, Raymond W. Smith, and Patrick E. White, "The Walls Coming Down: Interoperability Open the Electronic City," The Future of the Electronic Marketplace, The MIT Press, Cambridge, Massachusetts, 1998, pp. 265–301.

Richard Bort and Gerald R. Bielfeldt, "EDI on the Internet," Handbook of EDI, 1997, pp. B7–1–B7–19, Warren, Gorham & Lamont, USA.

Isabel Gallego, Jaime Delgado, and José J. Acebrón, "Distributed Models for Brokerage on Electronic Commerce," TREC'98, LINCS 1402, 1998, pp. 129–140, Springer–Verlag Berlin Heidelberg.

John J. Garguilo and Paul Markovitz, "Guidelines for the Evaluation of Electronic data Interchange Products," DRAFT—Technical Report CAML/CLS, Dec. 6, 1995, Gaithersburg, MD, USA.

Shikhar Ghosh, "Making Business Sense of the Internet," Harvard Business Review, Mar.–Apr. 1998, pp. 126–135.

Li–Pheng Khoo, Shu Beng Tor, and Stephen S. G. Lee, "The Potential of Intelligent Software Agents in the World Wide Web in Automating Part Procurement," International Journal of Purchasing and Materials Management, Jan. 1998, pp. 46–52.

Frederick J. Riggins and Hyeun–Suk (Sue) Rhee, "Toward a Unified View of Electronic Commerce," Communications of the ACM, Oct. 1998, vol. 41, No. 10, pp. 88–95.

* cited by examiner

*Primary Examiner*—Anil Khatri
*Assistant Examiner*—Joseph P. Hirl
(74) *Attorney, Agent, or Firm*—Ernest J. Beffel, Jr.; Haynes Beffel & Wolfeld LLP

(57) ABSTRACT

A system and method for automatic categorization of items into categories. Machine learning establishes or updates a data structure including term weights for text fields and distributions for numeric fields, based on a sample of pre-categorized items. An automatic categorization engine processes items by referencing the data structure on a field-by-field basis, determining a ranking score for each alternative category to which an item may be assigned. A category assignment may be based on ranking scores and may be flagged for a user to review. A user interface facilitates review and confirmation of automatic category assignments, either comprehensively, as flagged by the automatic categorization engine, or according to user determined criteria.

68 Claims, 6 Drawing Sheets

METHOD FOR AUTOMATIC CATEGORIZATION OF ITEMS

BACKGROUND OF INVENTION

Electronic commerce is a burgeoning industry. Buyers go online to find products that they used to walk through stores to locate. Part of the attractiveness of electronic shopping is the ease of locating products.

Vendors rely on taxonomies of product categories to help customers find products. A taxonomy typically is a multilevel, hierarchical classification of products, though many other approaches to categorizing products can be considered taxonomies. Many online vendors offer products from a variety of sources. The sources may offer similar, competing products or they may offer the same product at different prices. For customers who are shopping for the best price, it is particularly important for products to be properly classified in a taxonomy, so that similar and identical products are assigned to the same category.

Each time an online vendor receives product information to post in an electronic catalog, the product information needs to be classified. In some cases, parts of a printed catalog are updated and the entire catalog is resubmitted. In other cases, information from multiple vendors needs to be combined into a single catalog. The information supplied may include catalog content, images, buyer specific contract pricing, and inventory availability. In any case, the classification process is tedious, time consuming, relatively expensive and error prone. Therefore, it is desirable to have an automatic classification system which is capable of learning from previous product classifications and also capable of combining information from multiple vendors.

Substantial efforts have been devoted to automatic text classification, such as automated article clipping services. For instance, the Text REtrieval Conference (TREC) has been sponsored by the National Institute of Standards and Technology (NIST) and the Defense Advanced Research Projects Agency (DARPA) to bring together information retrieval researchers from around the world. The SMART/TREC collections of data have become standard test collections for information retrieval research. Many papers have grown out of TREC-related work, such as Amitabh Kumar Singhal's dissertation, Term Weighting Revisited (Cornell, January 1997). However, the work necessarily is focused on text classification, rather than product categorization, because the data collections consist of published articles, abstracts and U.S. patents. None of these collections include typical product information. The data items in these collections tend to include far more text than a typical product description for a catalog. Other work is ongoing in the area of web search engines, which attempt to retrieve the web pages most relevant to a user query.

Accordingly, it is desired to extend past work on information retrieval, taking into account the nature of product information, to generate an automatic product classification system in support of building catalogs for electronic commerce.

SUMMARY OF INVENTION

The present invention may be practiced as either a method or device embodying the method. One aspect of the present invention is a method of machine learning to automatically categorize items from a plurality of pre-categorized items, including counting a frequency of term usage by category for text fields, weighting the frequency by category based on a frequency of usage in other categories, and determining a distribution by category for values in one or more numeric fields. Terms may be a single word or both single words and phrases. Numeric fields may include prices or dimensions of a product to be listed a product catalog. Weightings of frequencies may be stored in a sparse matrix, a B-tree or other suitable data structure. The weighting of frequency use may be determined by a term frequency-inverse document frequency ranking algorithm or any of a variety of other ranking algorithms that are well known. The pre-categorized data used for machine learning may be filtered to eliminate outliers based, for instance, on standard deviations from a mean value or on a percentile of high and low outliers to be eliminated. An alternative aspect of the present invention for machine learning is learning the category assignments of particular, pre-categorized items. This proceeds on an item by item basis, instead of a category by category basis. This alternate embodiment includes counting a frequency of term usage by item for text fields, weighting the frequency by category based on a frequency of usage in other items or categories, and determining a distribution by category for values in one or more numeric fields. Related aspects of the first embodiment may apply to this alternate embodiment.

Another aspect of the present invention is automatically categorizing an item having both text and numeric fields. This aspect of the invention may include parsing terms from text fields of an uncategorized item, identifying categories associated with the terms, calculating ranking scores for the terms in the identified categories, and adjusting the ranking scores based on distributions for numeric fields associated with the item. Ranking scores may be normalized based on the number of terms in an uncategorized item. The invention may further include selecting one or more categories to assign an item to based on adjusted ranking scores. Alternative categories may be rank ordered and items flagged for review by a human user. The calculation of ranking scores for identified categories may include summing the weighted frequencies for terms parsed from text fields and normalizing the sum of frequencies based on the number of terms parsed. Alternatively, it may include summing by text field the weighted frequencies of the parsed terms, combining the sums across text fields according to a predetermined weighting formula, and normalizing the combined sum of weighted frequencies. One predetermined weighting formula would assign a greater weight to a text field in a filed containing a shorter description of the uncategorized item than a text field containing a long description. Adjusting such ranking scores may involve applying an additive or multiplicative factor or a decision rule. Another, alternative embodiment of the present invention is automatic categorization based on comparing terms of an uncategorized item to terms of previously categorized items, instead of terms in categories. In this embodiment, previously identified items are the subject of ranking scores, instead of categories. The categories to which the pre-categorized items are assigned are used as a template for assigning additional items. This is particularly useful when multiple vendors offer to sell the same item and parrot the manufacturer's description of the product. The first and alternate embodiments can be used together, for instance, relying on the alternate embodiment when a threshold ranking score is achieved and relying on the first embodiment otherwise.

The present invention further includes a user interface and method for assisting a human user in verifying or correcting automatic category assignments. Category assignments normally will be made with confidence scores. A method implementing the present invention may include selecting an automatically categorized item having a low confidence score, displaying alternative categorizations of the selected item together with their confidence scores and resetting the assigned category of a displayed item based on user input. Preferably, a single action by a user will indicate a preferred category for reassignment or a confirmation of the automatically selected category. It is also preferred to display alternative categorizations sorted by confidence score, preferably with the category assignment having the most favorable confidence score appearing prominently at the top of a list. It also will be helpful for a user to be able to see the details behind the calculation of one or more selected confidence scores, particularly during an initial phase when a library of pre-categorized items is being assembled as a basis for automatic classification.

DETAILED DESCRIPTION

Figure 1:
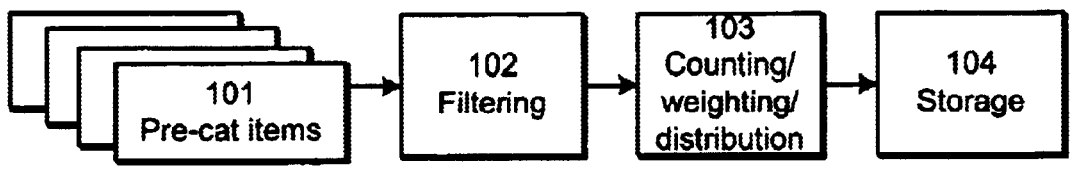
FIG. 1 illustrates machine learning from a set of pre-categorized items.
Figure 2:
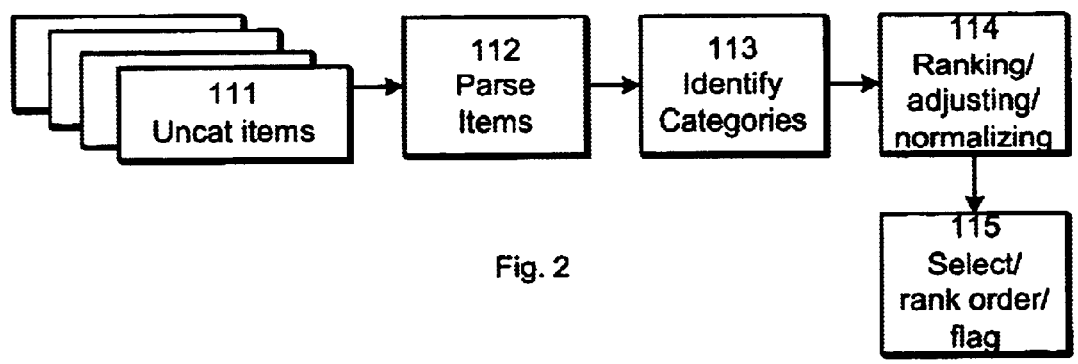
FIG. 2 illustrates automatic categorization based on machine learning.
Figure 3:
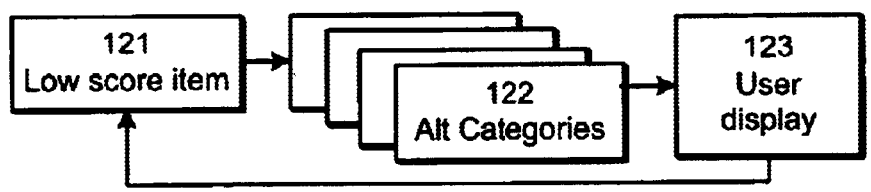
FIG. 3 illustrates a user interface for reviewing automatically categorized items.

The following detailed description is made with reference to the figures. FIGS. 1–3 provide the broadest overview.

FIG. 1 illustrates machine learning from items previously assigned to categories. The categories preferably form a hierarchical taxonomy. For instance, when the present invention is applied to products for an electronic commerce catalog, a hierarchy, such as the UNSPSC taxonomy, might include:

Communications, Computer Equipment, Peripherals, Components and Supples
  Network hardware and accessories
    Network routers and bridges
  Software
    Operating systems
      Personal computer operating system software Other categorizing and mapping schemes, such as network diagrams, may be used instead of hierarchical categorization. A useful survey of alternative categorization and visualization schemes is found in Ricardo Baeza-Yates & Berthier Ribeiro-Neto (eds.), "Modern Information Retrieval", Chapter 10, User Interfaces and Visualization (Addison Wesley 1999).

Each pre-categorized item 101 has at least two fields, sometimes referred to as attributes, in addition to a category field. It has one or more text fields and one or more numeric fields. Text fields may include a short and long product description or an abstract. Numeric fields may include pricing, such as suggested retail, wholesale, offered or customer specific pricing, product dimensions, product weight or any other field to which a numeric value is assigned.

Optionally, pre-categorized items are filtered 102, based on values in one or more numeric fields. In order to establish a baseline for filtering numeric values, the values corresponding to a particular category preferably should be read and analyzed. Alternatively, an historical baseline for numeric values in that category can be used, if one exists. The baseline may be any type of statistical or non-statistical distribution. Statistics such as mean, median, variance, standard deviation and percentile bands (e.g., top and bottom 10 percent bands) can be used for filtering. When a pre-categorized item has a numeric value (e.g., a retail price) which is more than a predetermined difference from what is expected for the category, the present invention may include filtering the outlier before machine learning for that category, so that the category is more homogeneous. The predetermined difference can be absolute or relative, including a difference measured in standard deviations. Extending the example above, assuming that personal computer operating systems are expected to cost $50 to $300, an operating system costing $5,000 would more likely be for a workstation or minicomputer. Filtering out an operating system that costs too much improves the quality of machine learning from pre-categorized items.

It is understood that terms are parsed from text fields, although this step is not separately depicted in FIG. 1. Text fields may be parsed for both single words and phrases. The use of single words and phrases improves the accuracy of automatic categorization. Stop words may be excluded, as they generally are considered noise in text searching. Cornell's SMART project has produced a suitable stop word list. Words may be stemmed and referenced through a thesaurus. The present invention may be applied to both simple parsing and contextual analysis of text fields.

Terms in fields of pre-categorized items are counted 103 for each category. Conceptually, the frequency of usage of terms may be accumulated in a sparse matrix, with rows for categories and columns for terms. For efficiency, the data may actually be accumulated in one or more B-trees or other efficient data structures. Efficiency is a consideration, because each term in each field of each item is likely to be processed.

Weighting 103 supplements counting 103, as a means of assigning greater importance to words distinctively corresponding to categories. One scheme for weighting words which is well known is a term frequency-inverse document frequency ranking algorithm. Those of ordinary skill in the art will understand that this and other ranking algorithms may be interchangeable for processing the text fields of pre-categorized items. Useful references on such ranking algorithms include William B. Frakes & Ricardo Baeza-Yates, "Information Retrieval Data Structures & Algorithms", Chapter 14, Ranking Algorithms (Prentice Hall 1992); Baeza-Yates et al., "Modem Information Retrieval", Chapter 13.4.4, Ranking. Other ranking algorithms include k-nearest neighbor, distance-weighted nearest neighbor, locally weighted regression and radial basis functions, which are discussed in Tom M. Mitchell, "Machine Learning", Chapter 8, Instance-Based Learning (McGraw Hill 1997).

For numeric fields, one or more distributions are determined by category from the pre-categorized items. The baselines used in optional filtering may be used or additional distributions may be determined.

It is useful to store 104 the results of counting and weighting term fields and determining distributions for numeric fields. When relative weighting of terms is used, dynamic recalculation of weights is resource intensive. Weights and distributions are efficiently stored on non-volatile memory for later use, for instance in the automatic categorization illustrated by FIG. 2.

An alternative machine learning application of the present invention involves determining a weighted frequency of usage of particular terms in particular items, rather than categories. This is useful when multiple suppliers add the same item to a catalog. It is not unusual for suppliers to adopt manufacturers' product descriptions. Then, multiple suppliers will use very similar product descriptions for the same product. Machine learning in accordance with the present invention can involve populating a matrix with term usage by item, rather than by category. The term frequencey inverse document freqency algorithm or other ranking algorithm can be applied on an item by item (product by product) basis, rather than a category by category basis. The resulting term matrixes include as many rows as there are usable items in the data used for training. Each row also includes reference to the category to which the product has been assigned and may include a ranking score for the degree of confidence associated with that assignment. For this application of the present invention, the techniques and features generally applicable to category by category learning may apply with equal force to item by item learning.

FIG. 2 illustrates automatic categorization of items. This process preferably follows machine learning, but may be based on manually prepared weighted frequencies for usage of terms. Uncategorized items are input 111 to a system including logic and resources for automatic categorization. Text fields are parsed 112 to identify terms. A data structure preferably indexed by term is accessed to identify categories 113 indicated by usage of the parsed terms. Weighted term frequency data is obtained from the data structure for each term and category. This data is combined, for instance as a sum, to produce ranking scores. A ranking score indicates the likelihood that the terms parsed from the item match an identified category. An initial ranking score may be normalized, based on the number of terms. For instance, the ranking score for an item having five terms may be divided by five and the ranking score for an item having ten terms may be divided by ten. When an item has more than one text field, the ranking scores of the individual fields can be calculated and normalized and then combined according to in a predetermined manner. Ranking scores for individual fields can be combined according to a linear additive, multiplicative or mixed formula or according to rules.

The values in numeric fields of the item can be used in many ways to affect automatic categorization, including as part of the overall combining formula or to adjust the ranking scores of text fields. Numeric values can be evaluated against the distribution for each identified category for potential automatic categorization. A weight can be assigned based on how close a value is to the mean or median value for a category. This weight can be combined with weights for text fields in a predetermined manner. Alternatively, numeric values evaluated against the distribution for a category can be used to adjust (increase or diminish) the normalized ranking scores for one or more text fields. For instance, a retail price which is more than three standard deviations from the mean retail price for a category may cause a text ranking score to be reduced by −0.1 or to be reduced by half. Preferably, the price fields are considered after the text fields have been used to identify categories, because price by itself is not a strong indicator of the proper category for an item.

One or more categories can be selected based on ranking scores for an item. It may be helpful to rank order the alternative categories by ranking score for further analysis. For ties and near ties, an item can be flagged to be brought to the attention of a user through the user interface process illustrated in FIG. 3.

Assignment of items to more than one category may be allowed in accordance with the present invention. When assignment to more than one category is allowed, decision rules need to be adjusted accordingly.

An alternative method for automatic categorization may be based on previously categorized items, instead of categories. This alternative method is generally the same as the method described above. Terms in an uncategorized item parsed, previously categorized items associated with those terms are identified, rankings scores are calculated for the identified items, and then adjusted based on values in one or more numeric fields of the uncategorized item. The adjusting step can be carried out based on values in individual identified items or on category distributions. Based on identified items, one or more numeric values of the uncategorized item would be compared to numeric values in the identified items, such as price. If the difference in values were great, the ranking score would suffer. If there were a match, the ranking score might be enhanced. Based on categories, the one or more numeric values would be compared to one or more distributions for categories associated with or corresponding to the identified items. The ranking score would be adjusted in accordance with the method previously described.

FIG. 3 depicts interaction of a user with an automatic categorization system, after items have been automatically assigned to categories. The user reviews items that either have been flagged by the category engine for user review or that the user selects. In experience, a ranking score of greater than 0.1 or 0.2 may indicate a good categorization and a ranking score of less than 0.1 may be a poor categorization. Items having a best candidate ranking score of less than 0.1 should be automatically flagged by the category engine. The user can select items in several ways, such as browsing a category tree or using a criteria such as items having a best ranking score less than 0.15 or items having top ranking scores that are separated by less than 0.05. One of ordinary skill in the art will, of course, recognize that these scores are dimensionless and provided for illustration only.

In FIG. 3, a low score item 121 is combined with alternate category assignments 122 for user display. A separate, sizable choose category window is preferably provided in which alternate category assignments are displayed with ranking scores. Either all or a subset of potential category assignments can be displayed. The user may have control over how many alternatives are displayed. If substantial detail is desired about one or more alternative categorizations, a separate detail window may be provided that displays each term for an item and a list of potential categories and corresponding category weights. Individual field names and weights assigned for combining fields also can be displayed in the detail window. This substantial detail is particularly helpful for understanding mistaken assignments and fine tuning a category assignment.

A user interacts with the choose category window of the display 123 to assign a category. The user begins with the choose category window. Additional detail can be displayed in a detail window for a potential categorization. The user can select one or more categories and then approve of the categorization. If only a single category assignment is allowed, the user can select a category with a single action, such as clicking, speaking, or typing a symbol on a keyboard.

A user selection of a category can be recorded for future reference, as indicated by the feedback from the user display 123 to the low score item 121. For instance, the supplier name, part number and other fields can be stored in a history file or master product database along with the category assignment. The history file can be a separate file or it can be part of the same file that is created by the machine learning process. History can be recorded for all assignments or on a confidence-related basis. It can be recorded just for assignments based high ranking scores or assignments made or reviewed by a user. When new products for a supplier need to be categorized, the combination of a supplier name and part number can be concatenated to form a term which is tested against a history file. A rule can be established, for instance, that if a particular supplier+part number term previously been assigned, the previous assignment will be adopted. Alternatively, it may be that when part numbers are the same, the description, price or some other field of the previously assigned item is close to that of the item to be categorized, then the previous categorization is reused. More details regarding software to implement the present invention and regarding the appearance of an interface are provided in additional figures.

Figure 4:
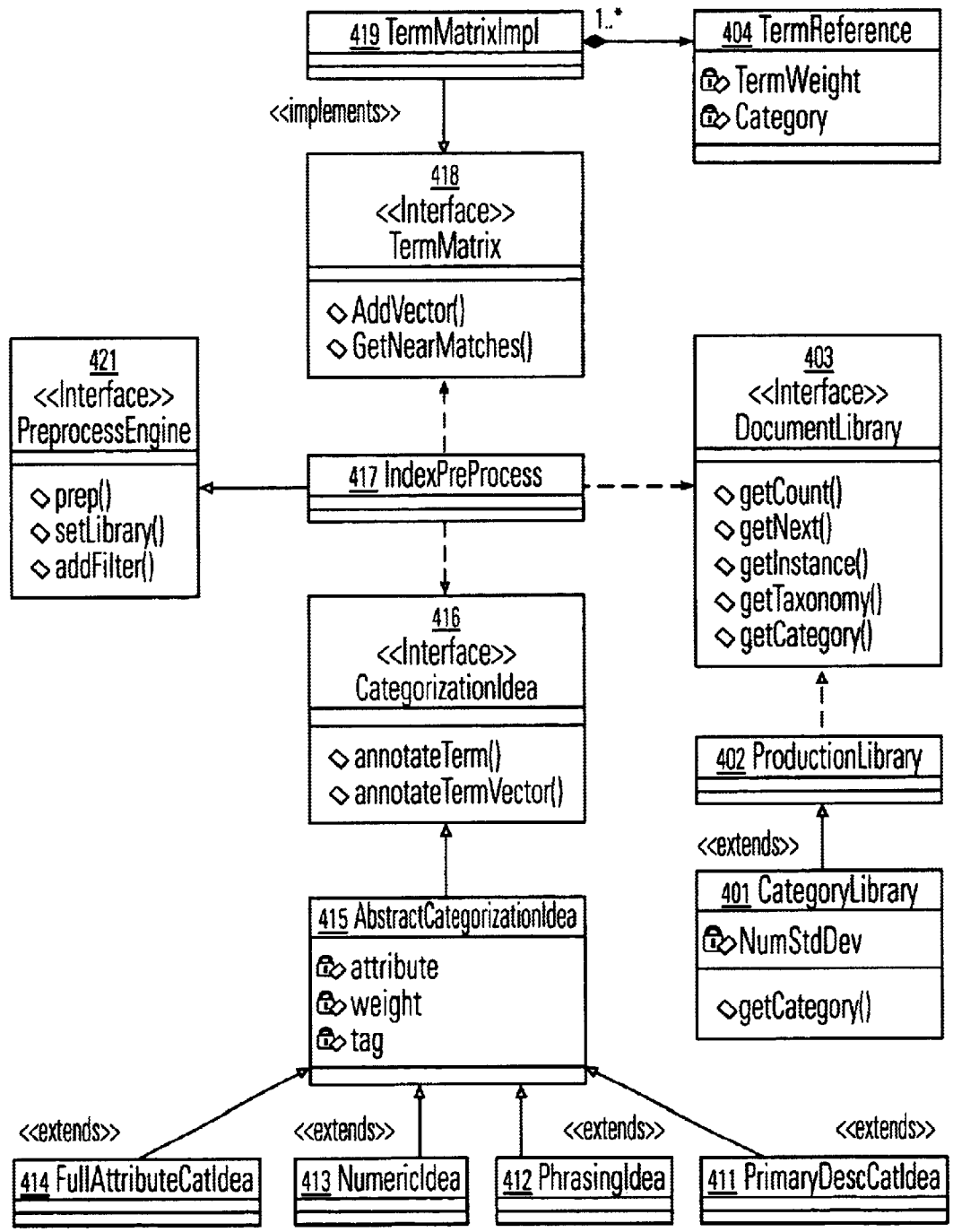
FIG. 4 is a simplified class diagram providing a pre-processing overview.

FIG. 4 is a simplified class diagram providing an overview of pre-processing and machine learning, as applied to building a catalog for an e-commerce site. This process operates on pre-categorized items. The filtering of pre-categorized items is carried out by CategoryLibrary 401. CategoryLibrary begins with a parameter for acceptable closeness, such as a number of standard deviations. CategoryLibrary invokes a routine such as getCategory( ) to read the data for a category and determine a distribution. Based on one or more parameters which may be combined with rules, CategoryLibrary 401 filters outliers and passes ProductInstances to ProductionLibrary 402 items which satisfy the acceptance parameters. ProductionLibrary 402 is invoked from DocumentLibrary 403. The DocumentLibrary interface provides IndexPreProcess 417 with a variety of services. Searching constraints can be added or cleared. Default field values can be identified. The items in a category or responsive to a search constraint can be retrieved or counted. Sequential and direct reading of items is supported. IndexPreProcess 417 invokes DocumentLibrary 403 repeatedly to step through categories and process a set of items in need of categorization. Terms from a category of items are passed to CategorizationIdea 416 in term vectors to be processed. An annotated term vector returned by CategorizationIdea 416 is passed to the interface TermMatrix 418, which builds a data structure. The data structure conceptually is a sparse matrix; it preferably is implemented as a pair of B-trees. The B-trees have different index structures, to reduce retrieval time during assignment of categories and processing time during calculation of term weights. One is organized by term and by field; the other by category. When the data structure is complete it is processed to generate relative frequency weights.

IndexPreProcess 417, which is invoked from the interface PreprocessEngine 421, parses fields, constructs term vectors from items and passes each term vector to the interface CategorizationIdea 416, which returns annotated an term vector. This interface operates in conjunction with the class AbstractCategorization idea 415. This interface and class are aware of the different types of categorization ideas. For each field, a term vector is annotated according to applicable categorization ideas. The types of categorization ideas preferably include FullAttributeCatIdea 414, NumericIdea 413, PhrasingIdea 412 and PrimaryDescCatIdea 411. The idea FullAttributeCatIdea 414 constructs a single term from a whole field and tags it, which is especially useful when an exact match is used, such as the full name of a supplier or product manufacturer. The idea NumericIdea 413 tags a numeric value, such as an item price. The idea PhrasingIdea 412 processes a vector of terms, for instance a string from a product description, and creates phrases of two or more adjacent words. Adjacent words may be directly adjacent or may be separated by a stop word, depending on the software configuration. The PhrasingIdea 412 annotates phrase terms so that they can be passed to TermMatrix 418. PrimaryDescCatIdea 411 annotates single words so that they can be passed to TermMatrix 418. A word can be identified by any of several tokenization methods, such as breaking on spaces or on special characters (e.g., - , ; . &). A preferred annotation scheme involves having a vector of unique terms each annotated with one or more three character tags such as "@PR." Each of the tags identifies a field in which the term appears. After CategorizationIdea 416 and AbstractCategorizationIdea 415 have built an annotated term vector from items for a category, the annotated term vector is passed through IndexPreProcess 417 to the interface TermMatrix 418.

The interface TermMatrix 418 works in conjunction with TermMatrixImpl 419. Annotated term vectors are processed by TermMatrix 418. A data structure is loaded, based on annotated term vectors. The data structure conceptually is a sparse matrix and preferably is implemented as a pair of B-trees. One B-tree may efficiently be organized by annotated term, mapping to categories in which the term appears. Another B-tree may be efficiently organized by category, mapping to annotated terms used in that category. In these data structures, the system maintains term-category pairs, counts of term-category occurrences and a calculated term weight. For numeric values, distribution statistics may be substituted for counts and term weights. Statistics for categories preferably are maintained in the B-tree organized by category. Annotated term vectors are added for one category at a time.

TermReference 404 is generated by TermMatrixImpl 419 on a term by term basis to store individual annotated terms from an annotated term vector.

When all of the categories in a preprocessing session have been added through the TermMatrix interface 418, this interface invokes a routine to recalculate term weights throughout the affected data structure, for instance, by calculating term frequency—inverse document frequency scores by term. Again, a variety of weighting schemes are expected to function equally well. It is preferred that a preprocessing session operate in a batch mode, because recalculation of relative term weights for a substantial set of categories involves much processing. It is preferred to minimize the number of times that term weights need to be recalculated by minimizing the number of batches. At the same time, the present invention is adapted to processing a small number of items or even a single item, as additions to an existing data structure accessed through the interface TermMatrix 418.

Figure 5:
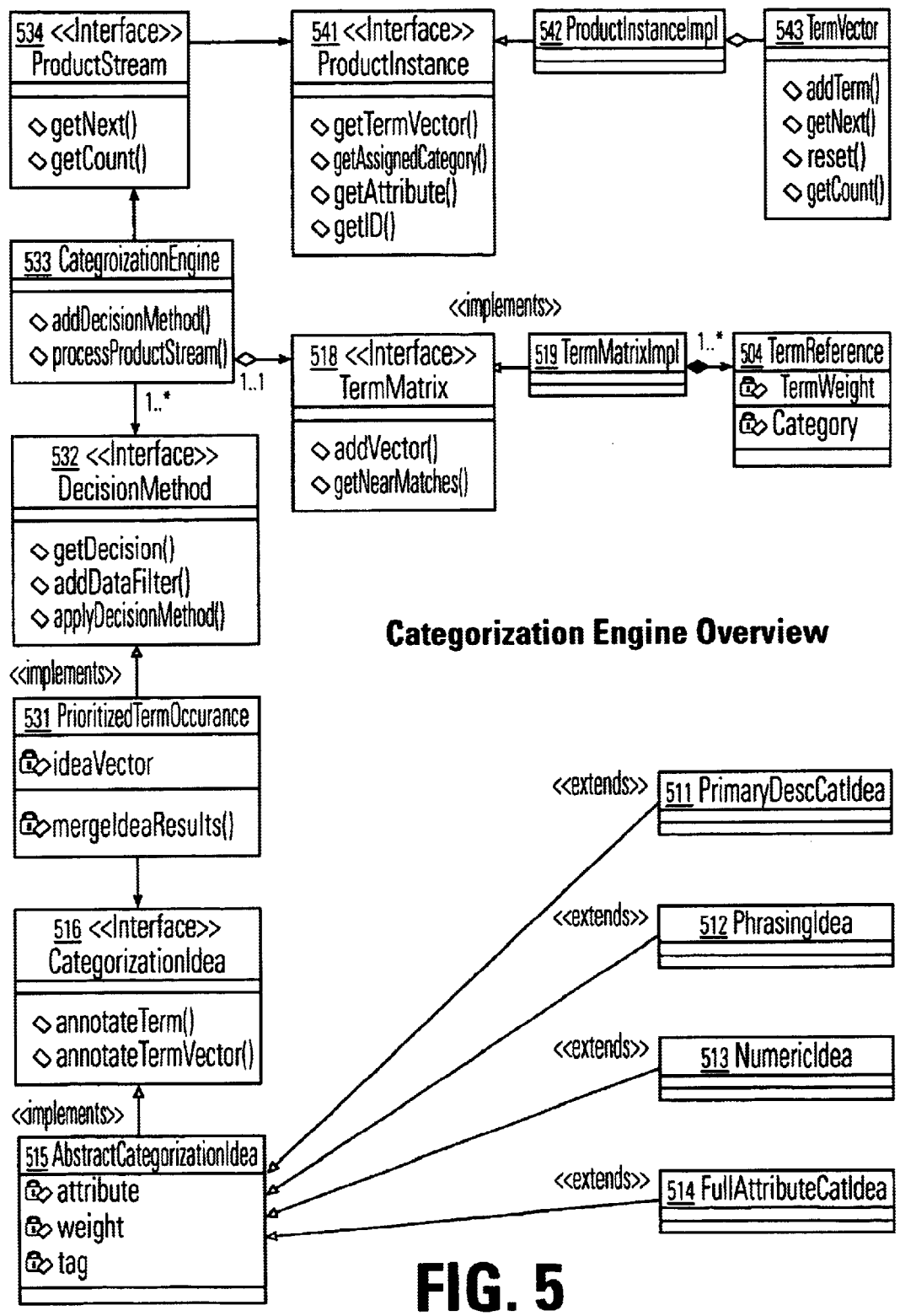
FIG. 5 is a simplified class diagram providing a categorization engine overview.

Turning to FIG. 5, parallel numbering is used to indicate software components that may function both for preprocessing during machine learning and for categorization during automatic assignment. The term matrix components may be reused: TermMatrix 518, TermMatrixImpl 519 and TermReference 504. The categorization components also may be reused: CategorizationIdea 516, AbstractCategorizationIdea 515, PrimaryDescCatIdea 511, PhrasingIdea 512, NumericIdea 513 and FullAttributeCatIdea 514. The primary new components are PrioritizedTermOccurrence 531, DecisionMethod 532, CategorizationEngine 533 and ProductStream 534.

During automatic categorization, the interface ProductStream 534 supplies instances of uncategorized items to CategorizationEngine 533, which will invoke Decision-Method 532 to categorize an item and ResultListener (not depicted) to add an item to a specified table after categorizing it. For cross-validation purposes, this procedure can be modified slightly, so that pre-categorized items can be supplied through ProductStream 534, and a modified ResultListener can record whether DecisionMethod 532 assigns the same category as associated with the pre-categorized item input.

The input stream through interface ProductStream is depicted in greater detail in FIG. 5 than the corresponding input stream in FIG. 4. ProductStream 534 works in conjunction with ProductInstance 541 and ProductInstanceImpl 542. ProductStream 534 functions both to provide a count of input items and to iterate through the stream of input items. For each item, Product Stream invokes the interface ProductInstance 541 which, in turn, invokes ProductInstanceImpl 542. ProductInstance may invoke a routine getTermVector to return an unfiltered, untagged, unphrased vector of terms. For either preprocessing or cross-validation, getAssignedCategory may return a value indicating the category to which an item has previously been assigned. The contents of individual fields may be returned by getAttribute, which is used to iterate through a field list. GetID may be used to directly retrieve an item with a particular ID, if that item appears in the input stream.

The input stream preferably is filtered by a unique product identifier so that products that previously have been categorized are not recategorized.

CategorizationEngine 533 uses the routine processProductStream to iterate over input items supplied through interface ProductStream 534. It sets the term matrix to be used downstream in DecisionMethod. Hence, CategorizationEngine 533 is depicted as interfacing directly with TermMatrix 518. Alternatively, different term matrixes could be used by each of the ideas labeled 511–14. Then, the diagram would better relate TermMatrix 518 with DecisionMethod 532, PrioritizedTermOccurrence 531 or CategorizationIdea 516. Once the applicable term matrix or matrixes are set, the individual ideas use term weights stored there.

CategorizationEngine 533 invokes the interface DecisionMethod 532 for each item returned from ProductStream 534. One or more term vectors for an item are acted upon by DecisionMethod. During process initialization, DecisionMethod may invoke addDataFilter to make a data filter available to ideas that apply filters. At the prompting of a user, DecisionMethod may invoke getDecisionExplanation to provide more detailed feedback. To process individual items, DecisionMethod invokes applyDecisionMethod, which invokes PrioritizedTermOccurrence 531. ApplyDecisionMethod may return a sorted vector of results. The sort may be by category or by confidence level or, alternatively, any other desired order.

PrioritizedTermOccurrence 531 operates on a vector of fields or attributes and their associated term vectors. For each field, the applicability of alternative categorization ideas contained in an ideaVector, (e.g., FIG. 5 as 511–14) is considered. For each idea applicable to a field, a term vector is passed to CategorizationIdea 516. To obtain the ranking scores associated with the available ideas, CategorizationIdea 516 is invoked. CategorizationIdea 516 works in conjunction with AbstractCategorizationIdea 515 to invoke available ideas such as PrimaryDescCatIdea 511, PhrasingIdea 512, Numeric Idea 513, and FullAttributeCatIdea 514. When it has processed the term vectors through all of the available ideas, it applies mergeIdeaResults. The weights for various ideas may be accessible through methods of those ideas. A weighting scheme combines the individual results of applying various ideas. The weighting scheme may further adjust weights based on the application of numeric ideas. These weights are merged or combined so that the most likely candidate category can be selected.

Two additional ideas not depicted in FIG. 5 should also be described. The first is a Bayesian idea. One aspect of data received from suppliers, for instance, is that the data received has a meaningful order. For instance, most laser printer cartridges sold by a distributor are likely to be grouped together. The Bayesian idea would be implemented after PrioritizedTermOccurrence has merged or combined weights from other ideas. Near-ties among top ranked candidate category assignment could be broken by an idea that kept a history of the category assigned to the last product instance or item, or kept a history of the last few category assignments in the stream of items. In this way, the automatic categorization engine would take advantage of the structure of the data that it was processing.

Figure 6:
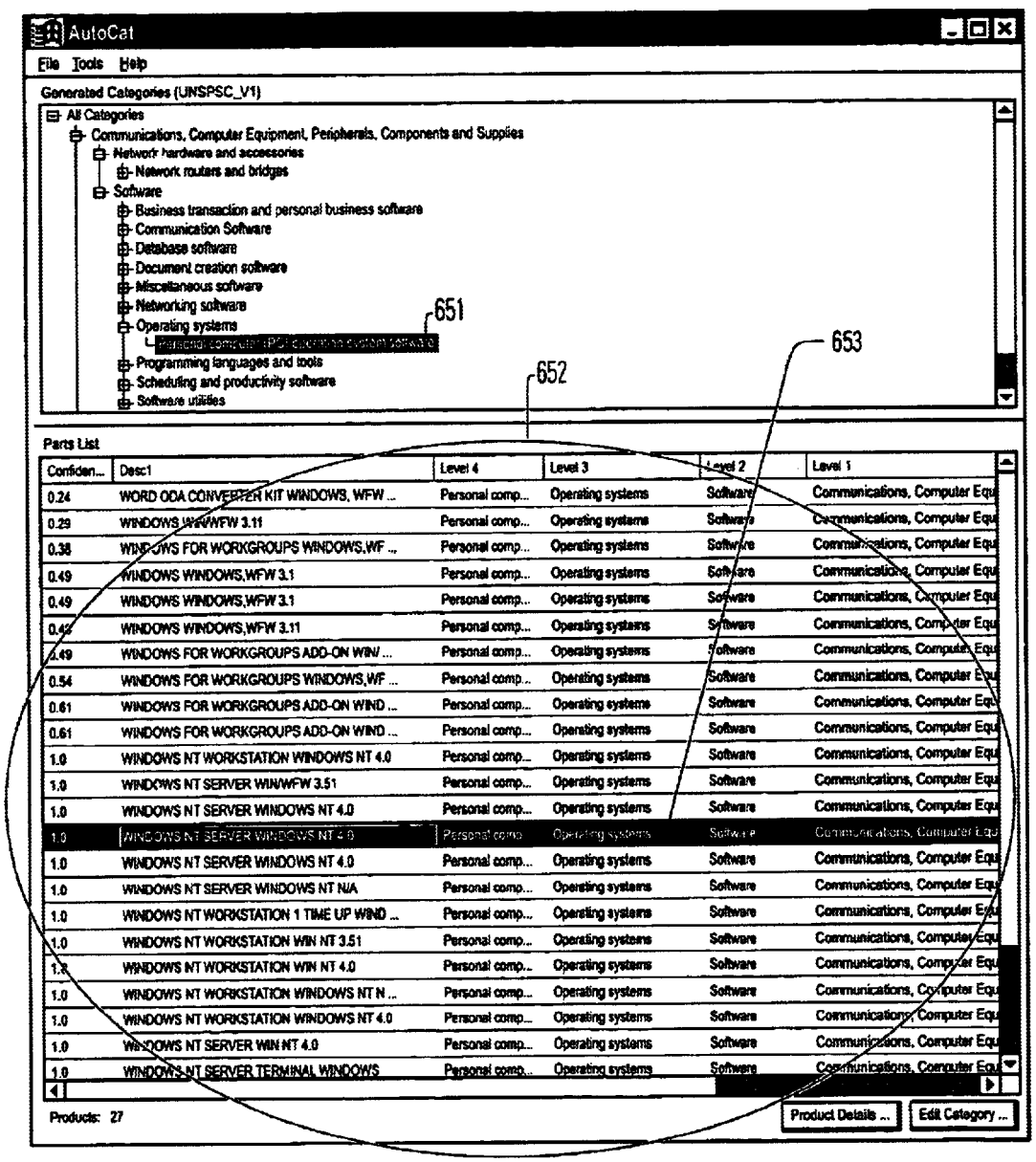
FIGS. 6–8 depict details of a user interface for reviewing automatically categorized items.

The second idea not illustrated is a category label matching idea. Each category has a label, as illustrated below, which combines the labels applied to the category and its parent categories. In FIG. 6, the combined category name is, "Communications, Computer Equipment, Peripherals, Components and Supplies; Software; Operating Systems; Personal Computer [PC] Operating System Software." Alternatively, less than the entire combined label can be used, such as using the lowest level(s) of the category tree, in this case, "Personal Computer [PC] Operating System Software." The terms for the labels can be stored in the training matrix with a unique annotation and a reference to their source. Terms found in product attributes which match the category label terms can be used to generated a list of matched categories. This list of categories can be merged with results of the other categorization ideas as described above.

Figure 7:
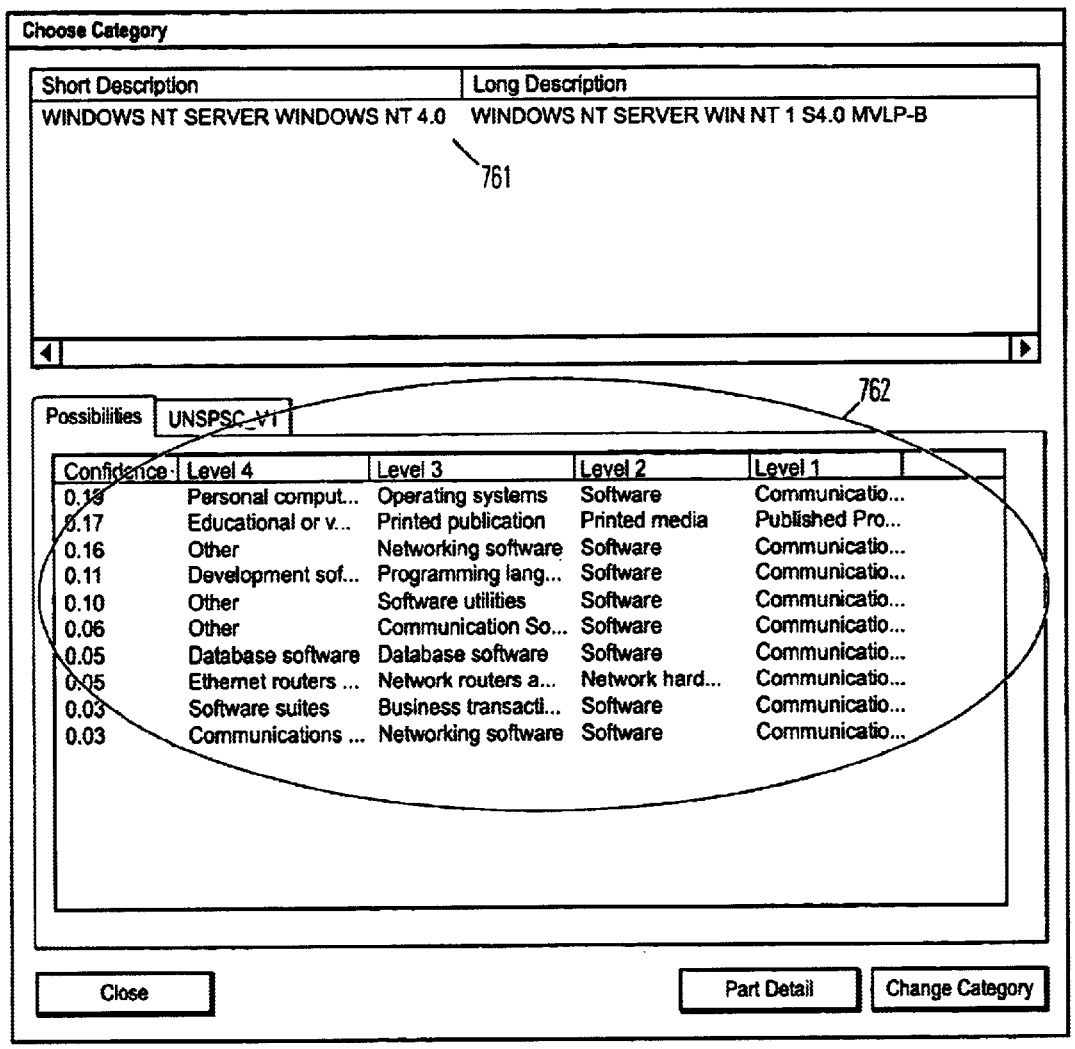
Figure 8:
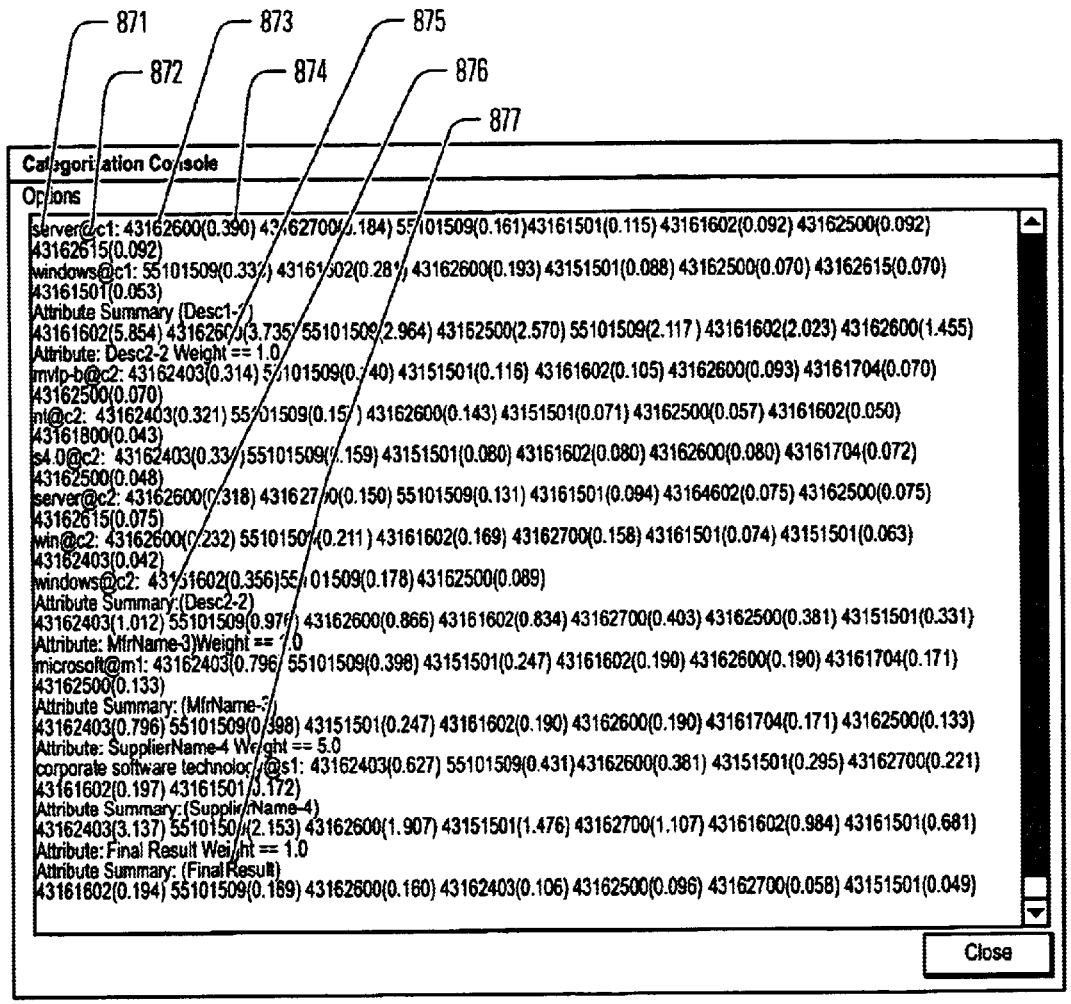

A user interface is depicted in FIGS. 6–8. FIG. 6 is a display of categories and assignments of products to a category. The category name 651 in this example is "personal computer [PC] operating system software", which is in the following hierarchy:

Communications, Computer Equipment, Peripherals, Components and Supplies
  Software
    Operating Systems
      Personal Computer [PC] Operating System Software The available categories can be accessed through a tree structure in this example. In alternative implementations, the top window 651 may list categories in which low confidence assignments have been made or it may be organized in any other manner convenient for the user.

The lower window 652 lists items and categories to which they have been assigned. The columns in this display include a confidence or ranking score for the assignment, an item identifier such a short part description, and levels of a hierarchical category taxonomy, in this example four levels deep. A user can use a single action, such as a single click or the mouse, a spoken line choice or other single action to select a particular item and obtain more detail.

FIG. 7 depicts additional detail supplied for item 653 in FIG. 6. Item 653 appears in FIG. 7 as 761. Additional detail can be provided in this view when one or more items are selected. More than one item may be selected, for instance, when the user can see that a list of product instance includes several consecutive versions of the same software package. In this example, short and long descriptions for one product are listed. Other details also could be listed. The bottom window 762 lists possibilities for categories to which the item might be assigned. Here, the possibilities are rank ordered, with the most likely assignment listed at the top. Comparing FIGS. 6 and 7, another aspect of the present invention is apparent, as a confidence level of 1.0 is set for item 653, 761, after the assignment has been made or reviewed by a user. As a configurable option, the system will assume that a user assignment or assignment confirmation is accurate and assign a corresponding confidence level to the assignment.

FIG. 8 illustrates additional detail that can be made available to explain an automatic assignment. This figure illustrates only part of the detail associated with automatic assignment of item 653, 761. In this example, the detail related to the item idea Desc2-2 begins at 875. Application of this idea to this field has a relative weight of 1.0. Six terms (after filtering) are listed for this idea, beginning with "mvlp-b" and ending with "windows". The attribute summary 876 lists category assignment possibilities, based on summing the weights by category for the six terms in the idea Desc2-2. The categories are designated in this example by eight digit labels. The calculated weights appear in parentheses. The final result attribute summary 877 reflects normalization of sums of weights or ranking scores and application of weighting by idea. One combined confidence score/ranking score/weight is assigned for each category that ranks as a possibility for assignment of the item, based on all the ideas for the item.

The detail associated with a single term is illustrated by 871–74. The term 871 is followed by a three character tag 872 which identifies the field in which the term appears. This is followed by pairs consisting of a category 873 and a weight 874.

The present invention, in its various forms, presents a number of advantages. The use of values in numeric fields, such as price, enhances the accuracy of machine learning and automatic categorization. Machine learning may include filtering of precategorized items based on numeric values in item fields to eliminate outliers. Items with a very high or low price, for instance, may be considered unlikely to fit a category and may be eliminated during training to reduce the variance among items assigned to a category. For both filtering and subsequent automatic assignment of items to categories, the machine learning determines distributions of numeric values of items by category. For filtering, this distribution allows identification of outliers. For automatic assignment to categories, the ranking or confidence scores for alternative categories to which an item might be assigned can be weighted or adjusted based on how well a value in a numeric field fits in a category-specific distribution for that field. Price is a field that can be compared to a mean price for a category. A ranking score can be adjusted positively, when a price matches the mean for a category with a narrow standard deviation, or adjusted negatively, when a price is an outlier. This enhances accuracy.

Use of a Bayesian idea further enhances accuracy, because it takes advantage of the structure of the data being received. It has long been recognized by those who design sort algorithms that real world data is nearly always partially ordered at the outset.

The user interface provides an efficient and cost effective means for confirming or correcting automatic category assignments. The interface allows comprehensive review of assignments throughout a category list or selective review of assignments tagged by the automatic assignment engine. The user can readily review the alternative assignments and select among them. A sophisticated user can look in detail at the term weights that accumulated to produce a ranking or confidence score for each alternative category to which the item might be assigned. Additional advantages of the present invention will be apparent to those skilled in the art.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of machine learning to automatically categorize items from a plurality of pre-categorized items having fields, wherein the fields include one or more text fields having terms and one or numeric fields having values, including the steps:
   (a) counting a frequency of usage of terms by category for one or more text fields in a plurality of pre-categorized items, wherein a term is a single word or both single words and phrases;
   (b) weighting the frequency of usage of a particular term in a particular category based on the frequency of usage of said particular term in other categories; and
   (c) determining a distribution by category for values in one or more numeric fields of said pre-categorized items.

2. The method of claim 1, wherein at least one value in a numeric field is a price for the pre-categorized item.

3. The method of claim 1, wherein at least one value in a numeric field is a dimension for the pre-categorized item.

4. The method of claim 1, wherein an item is a product to be listed in a product catalog.

5. The method of claim 1, wherein a category is a product category in a product catalog.

6. The method of claim 1, further including the step of storing the weighting of frequency usage and the distribution in a sparse matrix.

7. The method of claim 1, further including the step of storing the weighting of frequency usage and the distribution in a B-tree.

8. The method of claim 1, further including the step of storing the weighting of frequency usage and the distribution in a database.

9. The method of claim 1, wherein the weighting is determined by a term frequency—inverse document frequency ranking algorithm.

10. The method of claim 1, further including the step of filtering said pre-categorized items by values in one or more numeric fields to eliminate outliers,
   wherein the determining step precedes the filtering step which precedes the counting step.

11. The method of claim 10, wherein the filtering step eliminates outliers that are more than a predetermined number of standard deviations from the mean value for a numeric field.

12. The method of claim 10, wherein the filtering step eliminates predetermined percentiles of highest and lowest outliers.

13. A method of ranking for automatic categorization of an item having fields, wherein the fields include one or more text fields having terms and one or more numeric fields having values, and category by category data is available for a frequency of term usage and a distribution of values, including the steps:
   (a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

further including the step of normalizing ranking cores based on the number of parsed terms.

14. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

further including the step of selecting one or more categories based on the adjusted ranking scores.

15. The method of claim 14, further including the step of determining whether to flag the uncategorized item for human review.

16. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

further including the step of rank ordering categories based on the adjusted ranking scores.

17. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

wherein calculating ranking scores for an identified category includes summing the weighted frequencies for the parsed terms;

normalizing the sum of the weighted frequencies based on the number of parsed terms in the uncategorized item.

18. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories and (d) adjusting said ranking scores corresponding to a comparison of values in one or more numeric fields of the uncategorized item with corresponding distributions of numeric values;

wherein calculating ranking scores for an identified category includes summing by text field the weighted frequencies for the parsed terms;

combining the sums of weighted frequencies by text field according to a predetermined weighting formula;

normalizing the combined sum of weighted frequencies.

19. The method of claim 18, wherein the predetermined weighting formula assigns a greater weight to a text field containing a short description of the uncategorized item than a text field containing a long description of the uncategorized item.

20. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

wherein the adjusting step includes applying a multiplicative factor to said ranking scores.

21. A method of ranking for automatic categorization of an item having fields, wherein the fields include one or more text fields having terms and one or more numeric fields having values, and category by category data is available for a frequency of term usage and a distribution of values, including the steps:

(a) parsing terms in one or more text fields of an uncategorized item;

(b) identifying categories associated with the terms;

(c) calculating ranking scores for the terms in the identified categories; and (d) adjusting said ranking scores corresponding to a comparison of values in one or more numeric fields of the uncategorized item with corresponding distributions of numeric values;

wherein the adjusting step includes applying an additive factor to said ranking scores.

22. A method of ranking for automatic categorization of an item having fields, wherein the fields include one or more text fields having terms and one or more numeric fields having values, and category by category data is available for a frequency of term usage and a distribution of values, including the steps:
(a) parsing terms in one or more text fields of an uncategorized item;
(b) identifying categories associated with the terms;
(c) calculating ranking scores for the terms in the identified categories; and
(d) adjusting said ranking scores corresponding to a comparison of values in one or more numeric fields of the uncategorized item with corresponding distributions of numeric values;
wherein the adjusting step includes applying a decision rule to said ranking scores.

23. A method of automatically categorizing an item having fields, wherein the fields include one or more text fields having terms and one or more numeric fields having values, and category by category data is available for a frequency of term usage and a distribution of values, including the steps:
(a) parsing terms in one or more text fields of an uncategorized item;
(b) determining for each text field the applicable ranking ideas;
(c) identifying categories associated with the terms for the applicable ranking ideas;
(d) calculating ranking scores for the terms for the applicable ranking ideas in the identified categories; and
(e) adjusting said ranking scores corresponding to comparison of values in one or more numeric fields of the uncategorized item with corresponding distributions of numeric values;
further including the step of selecting one or more categories based on the adjusted ranking scores.

24. The method of claim 23, further including the step of normalizing ranking scores based on the number of parsed terms.

25. The method of claim 23, further including the step of determining whether to flag the uncategorized item for human review along with adjusted ranking scores for a plurality of the identified categories.

26. The method of claim 23, wherein calculating ranking scores for an identified category includes
summing weighted frequencies for the parsed terms;
normalizing the sum of the weighted frequencies based on the number of parsed terms in the uncategorized item.

27. The method of claim 23, wherein calculating ranking scores for an identified category includes
summing weighted frequencies for the parsed terms;
combining the sums of weighted frequencies according to a predetermined weighting formula;
normalizing the combined sum of weighted frequencies.

28. The method of claim 23, wherein the predetermined weighting formula assigns a greater weight to a ranking field containing a short description of the uncategorized item than a text field containing a long description of the uncategorized item.

29. The method of claim 23, wherein the adjusting step includes applying a multiplicative factor to said ranking scores.

30. The method of claim 23, wherein the adjusting step includes applying an additive factor to said ranking scores.

31. The method of claim 23, wherein the adjusting step includes applying a decision rule to said ranking scores.

32. A method of automatically categorizing an item having fields, wherein the fields include one or more text fields having terms and one or more numeric fields having values, and category by category data is available for a frequency of term usage and a distribution of values, including the steps:
(a) parsing terms in one or more text fields of an uncategorized item;
(b) determining for each text field the applicable ranking ideas;
(c) identifying categories associated with the terms for the applicable ranking ideas;
(d) calculating ranking scores for the terms for the applicable ranking ideas in the identified categories; and
(e) adjusting said ranking scores corresponding to comparison of values in one or more numeric fields of the uncategorized item with corresponding distributions of numeric values;
further including the step of rank ordering categories based on the adjusted ranking scores.

33. A method of machine learning to automatically categorize items from a plurality of pre-categorized items having fields, wherein the fields include one or more text fields having terms and one or more numeric fields having values, including the steps:
(a) counting a frequency of usage of terms in one or more text fields in a plurality of pre-categorized items wherein a term is a single word or both single words and phrases;
(b) weighting the frequency of usage of a particular term in a particular item based on the frequency of usage of said particular term in other items; and
(c) determining a distribution by category for values in one or more numeric fields of said pre-categorized items.

34. The method of claim 33, wherein at least one value in a numeric field is a price for the pre-categorized item.

35. The method of claim 33, wherein at least one value in a numeric field is a dimension for the pre-categorized item.

36. The method of claim 33, wherein an item is a product to be listed in a product catalog.

37. The method of claim 33, wherein a category is a product category in a product catalog.

38. The method of claim 33, further including the step of storing the weighting of frequency usage and the distribution in a sparse matrix.

39. The method of claim 33, further including the step of storing the weighting of frequency usage and the distribution in a B-tree.

40. The method of claim 33, further including the step of storing the weighting of frequency usage and the distribution in a database.

41. The method of claim 33, wherein the weighting is determined by a term frequency—inverse document frequency ranking algorithm.

42. The method of claim 33, further including the step of filtering said pre-categorized items by values in one or more numeric fields to eliminate outliers,
wherein the determining step precedes the filtering step which precedes the counting step.

43. The method of claim 42, wherein the filtering step eliminates outliers that are more than a predetermined number of standard deviations from the mean value for a numeric field.

44. The method of claim 42, wherein the filtering step eliminates predetermined percentiles of highest and lowest outliers.

45. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item
   wherein the adjusting step further includes comparing the values in one or more numeric fields of the uncategorized item with corresponding values in numeric fields of the identified items.

46. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   wherein category by category data is available for one or more distributions of values and the adjusting step compares the values in one or more numeric fields of the uncategorized item with the distributions of values for categories corresponding to the identified items.

47. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   further including the step of normalizing ranking scores based on the number of parsed terms.

48. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   further including the step of selecting one or more categories based on the adjusted ranking scores.

49. The method of claim 48, further including the step of determining whether to flag the uncategorized item for human review.

50. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   further including the step of rank ordering categories based on the adjusted ranking scores.

51. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   wherein calculating ranking scores for an identified category includes
      summing the weighted frequencies for the parsed terms;
      normalizing the sum of the weighted frequencies based on the number of parsed terms in the uncategorized item.

52. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and
   (d) adjusting said ranking scores based on values in one or more numeric fields of the uncategorized item;
   wherein calculating ranking scores for an identified category includes
      summing by text field the weighted frequencies for the parsed terms;
      combining the sums of weighted frequencies by text field according to a predetermined weighting formula;
      normalizing the combined sum of weighted frequencies.

53. The method of claim 52, wherein the predetermined weighting formula assigns a greater weight to a text field containing a short description of the uncategorized item than a text field containing a long description of the uncategorized item.

54. A method of ranking for automatic categorization of an item having fields, wherein the fields include one or more text fields having terms and one or more numeric fields having values, including the steps:
   (a) parsing terms in one or more text fields of an uncategorized item;
   (b) identifying items associated with the terms;
   (c) calculating ranking scores for the terms in the identified items; and (d) adjusting said ranking scores based on values in one or more numeric fields of the uncategorized item;

wherein the adjusting step includes applying a multiplicative factor to said ranking scores.

55. A method of ranking for automatic categorization of an item having fields, wherein the fields include one or more text fields having terms and one or more numeric fields having values, including the steps:

(a) parsing terms in one or more text fields of an uncategorized item;

(b) identifying items associated with the terms;

(c) calculating ranking scores for the terms in the identified items; and (d) adjusting said ranking scores based on values in one or more numeric fields of the uncategorized item;

wherein the adjusting step includes applying an additive factor to said ranking scores.

56. A method of ranking for automatic categorization of an item having fields, wherein the fields include one or more text fields having terms and one or more numeric fields having values, including the steps:

(a) parsing terms in one or more text fields of an uncategorized item;

(b) identifying items associated with the terms;

(c) calculating ranking scores for the terms in the identified items; and (d) adjusting said ranking scores based on values in one or more numeric fields of the uncategorized item;

wherein the adjusting step includes applying a decision rule to said ranking scores.

57. A method of ranking for automatic categorization of an item having fields, wherein the fields include one or more text fields having terms and one or numeric fields having values, including the steps:

(a) parsing terms in one or more text fields of an uncategorized item;

(b) determining for each text field the applicable categorization ideas;

(c) identifying items associated with the terms for the applicable categorization ideas;

(d) calculating ranking scores for the terms for the applicable categorization ideas in the identified items; and (e) adjusting said ranking scores based on values in one or more numeric fields of the uncategorized item;

wherein the adjusting step further includes comparing the values in one or more numeric fields of the uncategorized item with corresponding values in numeric fields of the identified items.

58. The method of claim 57, wherein category by category data is available for one or more distributions of values and the adjusting step compares the values in one or more numeric fields of the uncategorized item with the distributions of values for categories corresponding to the identified items.

59. The method of claim 57, further including the step normalizing ranking scores based on the number of parsed terms.

60. The method of claim 57, further including the step of selecting one or more categories based on the adjusted ranking scores.

61. The method of claim 60, further including the step of determining whether to flag the uncategorized item for human review along with adjusted ranking scores for a plurality of the identified categories.

62. The method of claim 57, further including the step of rank ordering categories based on the adjusted ranking scores.

63. The method of claim 57, wherein calculating ranking scores for an identified category includes summing weighted frequencies for the parsed terms;

normalizing the sum of the weighted frequencies based on the number of parsed terms in the uncategorized item.

64. The method of claim 57, wherein calculating ranking scores for an identified category includes summing weighted frequencies for the parsed terms;

combining the sums of weighted frequencies according to a predetermined weighting formula;

normalizing the combined sum of weighted frequencies.

65. The method of claim 64, wherein the predetermined weighting formula assigns a greater weight to a ranking field containing a short description of the uncategorized item than a text field containing a long description of the uncategorized item.

66. The method of claim 57, wherein the adjusting step includes applying a multiplicative factor to said ranking scores.

67. The method of claim 57, wherein the adjusting step includes applying an additive factor to said ranking scores.

68. The method of claim 57, wherein the adjusting step includes applying a decision rule to said ranking scores.

* * * * *